United States Patent [19]

Farrell

[11] Patent Number: 5,624,227
[45] Date of Patent: Apr. 29, 1997

[54] SEAL FOR GAS TURBINES

[75] Inventor: Thomas R. Farrell, Rexford, N.Y.

[73] Assignee: General Electric Co., Schenectady, N.Y.

[21] Appl. No.: 553,172

[22] Filed: Nov. 7, 1995

[51] Int. Cl.⁶ .................................................. F01D 25/26
[52] U.S. Cl. .................. 415/139; 415/170.1; 277/9.5; 277/167.5; 277/236
[58] Field of Search ........................... 415/170.1, 139; 277/9.5, 167.5, 209, 210, 236

[56] References Cited

U.S. PATENT DOCUMENTS

| | | | |
|---|---|---|---|
| 3,313,553 | 4/1967 | Gastineau | 277/236 |
| 3,870,322 | 3/1975 | Marshall | 277/167.5 |
| 4,188,037 | 2/1980 | Abbes et al. | 277/236 |
| 4,537,024 | 8/1985 | Grosjean | 415/139 |
| 4,602,888 | 7/1986 | Court et al. | 277/236 |
| 4,603,892 | 8/1986 | Abbes et al. | 277/236 |
| 4,902,198 | 2/1990 | North | 415/115 |
| 5,158,430 | 10/1992 | Dixon et al. | 415/139 |
| 5,338,152 | 8/1994 | Feldmann | 415/139 |
| 5,509,669 | 4/1996 | Wolfe et al. | 277/167.5 |

*Primary Examiner*—Edward K. Look
*Assistant Examiner*—Mark Sgantzos
*Attorney, Agent, or Firm*—Nixon & Vanderhye

[57] ABSTRACT

A seal for gas turbines includes first and second ends and a central section. The end sections have a greater thickness than the central section, thereby forming a recess about the central section. The ends are constructed using two offset radii such that they are substantially oblong-shaped to obtain an improved engagement capability. A filler material is provided in the recess to reduce the tendency of the seal to flop over at assembly.

8 Claims, 3 Drawing Sheets

SEAL FOR GAS TURBINES

TECHNICAL FIELD

This invention relates to a seal for gas turbines and, more particularly, to a seal for a turbine stator component that includes multiple segments or pieces where a seal is applied to control secondary air flow.

BACKGROUND

Turbine stator components that require a seal include nozzles, shrouds and interstage components as shown in FIG. 1. These seals are generally applied to segment circumferential gaps to control airflow that is driven by a pressure gradient across the turbine stator component.

Referring to FIG. 2, airflow through the segment gap 31 is controlled by a seal 32 assembled into a seal slot 33. The cross-sectional geometry of the seals has in the past consisted of a variety of shapes as shown in FIG. 3. Many of these incorporate a more narrow or recessed center section 41 and thicker end sections 42. This arrangement enables the seal to engage into misaligned seal slots that result from tolerance stack ups. The construction of the recessed shape is typically accomplished by either bending sheet metal or by fabrication of metal wire and sheet stock by a braze joint 43.

Use of recessed seals is sometimes restricted in gas turbines whose external casings are designed with a horizonal bolt flange along each side. At these locations, where hand alignment of the seal is difficult, a recessed seal is typically not used as the recessed seal tends to flop over, preventing engagement of the seal into the seal slot.

DISCLOSURE OF THE INVENTION

It is therefore an object of the invention to provide a seal for gas turbines that is shaped to obtain an improved engagement capability. It is another object of the invention to provide a seal having a reduced tendency to flop over at assembly.

These and other objects and advantages of the invention are achieved by providing a seal in a turbine stator component including a central section; a first end integral with the central section and having a thickness greater than the central section; a second end integral with the central section and having thickness greater than the central section, the first and second ends forming a recessed section about the central section; and a filler disposed in the recessed section.

The first and second ends may include two offset radii such that they are substantially oblong shaped. In addition, the filler is preferably wax, and the turbine stator component includes at least one of nozzles, shrouds and interstage components.

In accordance with another aspect of the invention, there is provided a seal in a turbine stator component including a central section having a first thickness; a first end integral with the central section and having a second thickness, greater than the first thickness; and a second end integral with the central section and having a third thickness, greater than the first thickness, the first and second ends forming a recessed section about the central section, wherein the first end includes two offset radii such that it is substantially oblong shaped.

The second end may also include two offset radii such that it is substantially oblong shaped and filler may be disposed in the recessed section, wherein the filler is preferably formed of wax.

BRIEF DESCRIPTION OF THE DRAWINGS

These and other aspects and advantages of the present invention will become apparent from the following detailed description of preferred embodiments when taken in conjunction with the accompanying drawings in which.

BEST MODE FOR CARRYING OUT THE INVENTION

Figure 1:
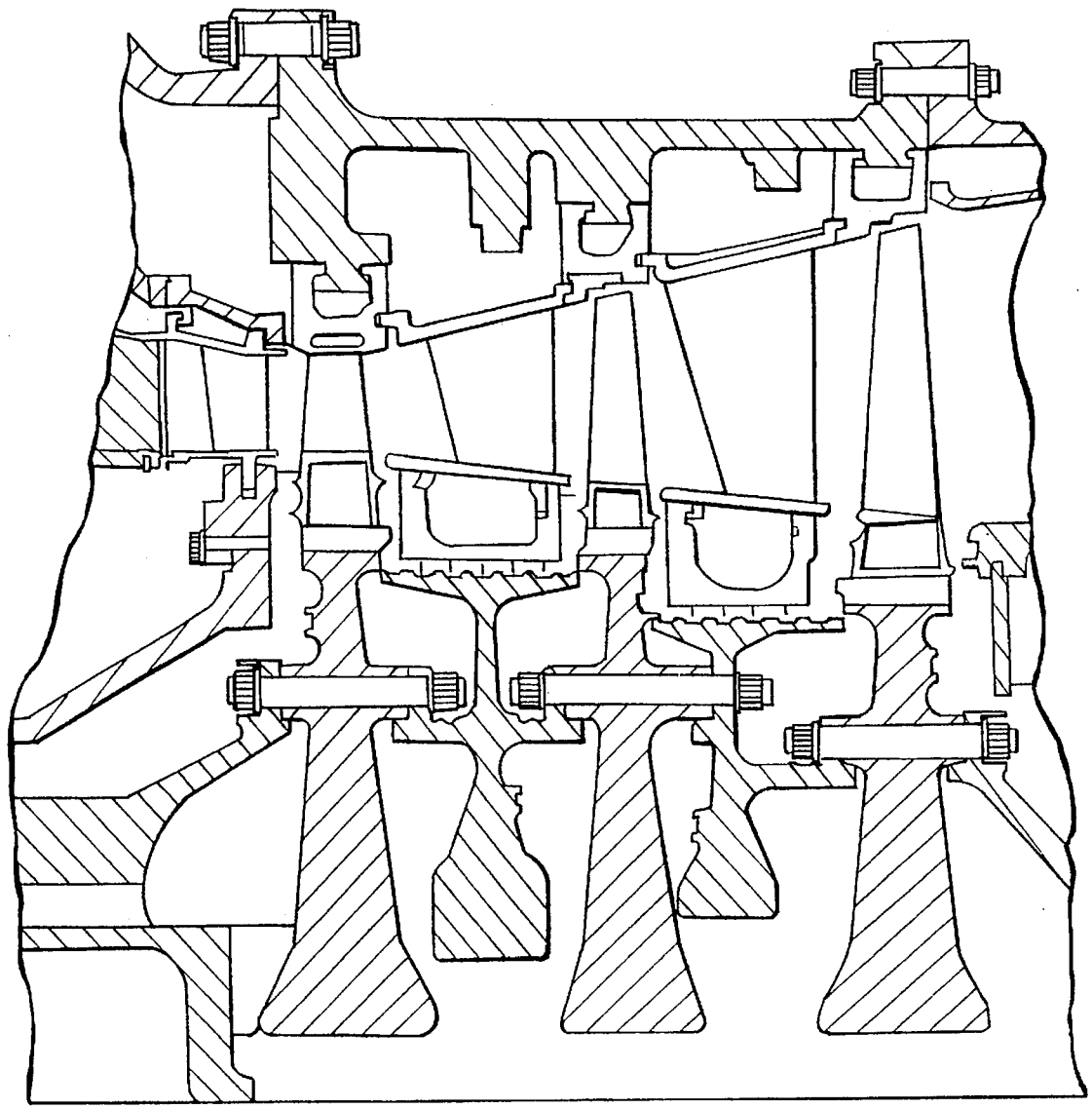
FIG. 1 is a cross-sectional view through a gas turbine.
Figure 2:
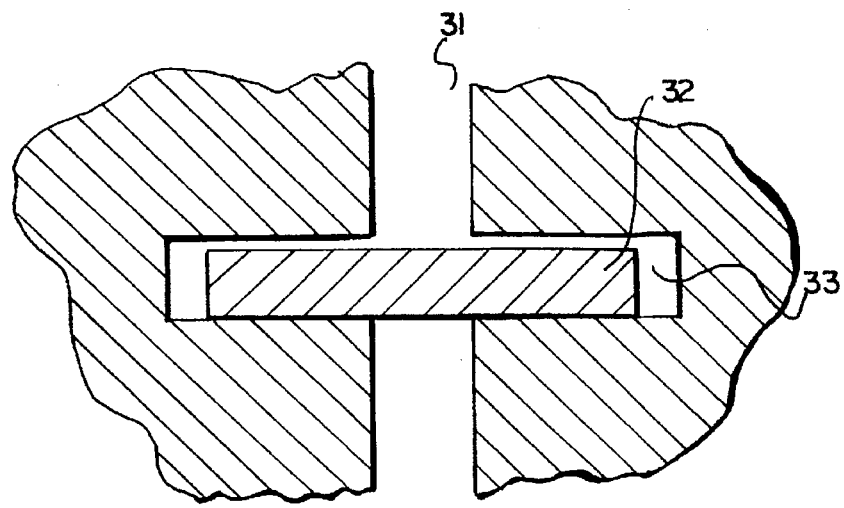
FIG. 2 illustrates a segment gap in a turbine stator component.
Figure 3A:
FIGS. 3(A)-(C) illustrates cross-sectional geometries of conventional seals.
Figure 3B:
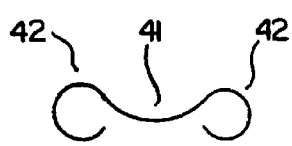
Figure 3C:
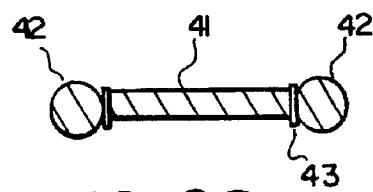
Figure 4:
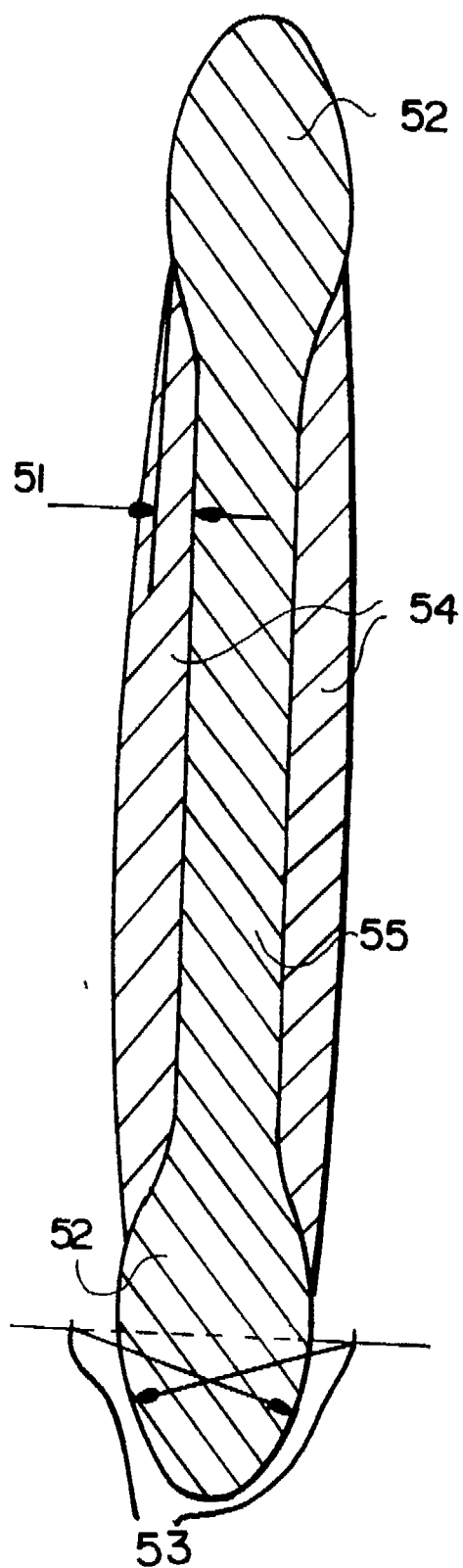
FIG. 4 is a cross-sectional view of the seal according to the invention.

FIG. 4 illustrates the seal according to the invention. Although the seal is described in conjunction with its use for gas turbines, those of ordinary skill in the art will contemplate alternative applications, and the invention is not meant to be so limited. In addition, the seal of the invention is applicable to both power generation and aircraft engine sealing applications.

Referring to FIG. 4, the seal according to the invention includes first and second ends 52 and a central section 55 between the ends 52. The central section 55 has a narrower thickness than the ends 52, thereby forming a recessed section 51 surrounding the central section 55.

The ends 52 are preferably substantially oblong-shaped as they are constructed using two offset radii 53 to obtain an improved engagement capability. During engagement, the oblong-shaped ends 52 enable the seal to be inserted in a wedge-like manner. Thus, engagement capability is improved over, for example, a seal having circular-shaped ends.

A filler material 54 is disposed in the recess. The filler material 54 significantly reduces the tendency of the recessed seal to flop over at assembly by supporting the seal during alignment. The filler material extends sufficiently outward from the recess 51 to maintain the seal upright in the turbine component. The filler material is preferably formed of a material having characteristics of limited compliancy (so as to locally but not excessively deform when hand pressure is applied) and shall preferably dissipate, melt or vaporize at normal engine operating temperatures. One example of such a filler material is wax.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal comprising:
   a central section;
   a first end integral with said central section and having a thickness greater than said central section;
   a second end integral with said central section and having a thickness greater than said central section, said first and second ends forming a recessed section about said central section; and
   a filler disposed in said recessed section, said filler being formed of a material that will one of dissipate, melt and vaporize at normal engine operating temperatures.

2. A seal according to claim 1, wherein said first end comprises two offset radii such that it is substantially oblong-shaped.

3. A seal according to claim 2, wherein said second end comprises two offset radii such that it is substantially oblong-shaped.

4. A seal according to claim 1, wherein said filler comprises wax.

5. A seal according to claim 1, wherein said seal is used in a turbine stator component comprising at least one of nozzles, shrouds and interstage components.

6. A seal in a turbine stator component comprising:

a central section;

a first end integral with said central section and having thickness greater than said central section;

a second end integral with said central section and having a thickness greater than said central section, said first and second ends forming a recessed section about said central section, wherein said first end comprises two offset radii such that it is substantially oblong-shaped; and a filler disposed in said recessed section, said filler comprising wax.

7. A seal according to claim 6, wherein said second end comprises two offset radii such that it is substantially oblong-shaped.

8. A seal according to claim 6, wherein said turbine stator component comprises at least one of nozzles, shrouds and interstage components.

* * * * *